(12) United States Patent
Chen et al.

(10) Patent No.: US 11,553,528 B2
(45) Date of Patent: Jan. 10, 2023

(54) METHOD OF CONFIGURING RANDOM ACCESS RESOURCE, TERMINAL, AND NETWORK NODE

(71) Applicant: VIVO MOBILE COMMUNICATION CO., LTD., Guangdong (CN)

(72) Inventors: Li Chen, Guangdong (CN); Yumin Wu, Guangdong (CN); Xiaodong Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/624,589

(22) PCT Filed: Jun. 13, 2018

(86) PCT No.: PCT/CN2018/091035
§ 371 (c)(1),
(2) Date: Dec. 19, 2019

(87) PCT Pub. No.: WO2018/233523
PCT Pub. Date: Dec. 27, 2018

(65) Prior Publication Data
US 2020/0137801 A1  Apr. 30, 2020

(30) Foreign Application Priority Data
Jun. 19, 2017  (CN) .......................... 201710466283.2

(51) Int. Cl.
*H04W 74/08* (2009.01)
*H04W 74/00* (2009.01)

(52) U.S. Cl.
CPC ..... *H04W 74/0833* (2013.01); *H04W 74/004* (2013.01); *H04W 74/006* (2013.01)

(58) Field of Classification Search
None
See application file for complete search history.

(56) References Cited

U.S. PATENT DOCUMENTS

2010/0265919 A1* 10/2010 Ma .......................... H04L 47/76
370/332
2016/0150591 A1  5/2016 Tarighat Mehrabani et al.
(Continued)

FOREIGN PATENT DOCUMENTS

CN  101841791 A  9/2010
CN  109039408 A  12/2018
(Continued)

OTHER PUBLICATIONS

International Preliminary Report on Patentability and Translation of International Preliminary Report on Patentability, dated Dec. 24, 2019, for corresponding PCT Application No. PCT/CN2018/091035, International Filing Date of Jun. 13, 2018 consisting of 4 pages.

(Continued)

*Primary Examiner* — Gregory B Sefcheck
*Assistant Examiner* — Srinivasa R Reddivalam
(74) *Attorney, Agent, or Firm* — Brooks Kushman P.C.

(57) ABSTRACT

A method of configuring a random access resource, a terminal, and a network node are provided. The method includes: receiving configuration information of a physical random access channel PRACH resource transmitted by a network node; wherein the configuration information is configured to indicate a PRACH transmission resource reserved by the network node for the terminal and used to transmit a beam failure recovery request.

10 Claims, 2 Drawing Sheets

Receiving configuration information of a Physical Random Access Channel (PRACH) resource transmitted by a network device ⸺11

(56) References Cited

U.S. PATENT DOCUMENTS

| | | | |
|---|---|---|---|
| 2016/0278083 A1* | 9/2016 | Dinan | H04L 5/0098 |
| 2018/0138962 A1* | 5/2018 | Islam | H04B 7/0695 |
| 2018/0287860 A1* | 10/2018 | Xia | H04L 5/0091 |
| 2018/0324865 A1* | 11/2018 | Hui | H04W 74/006 |
| 2018/0367200 A1* | 12/2018 | Wiberg | H04B 7/0617 |
| 2020/0059398 A1* | 2/2020 | Pan | H04W 72/0413 |
| 2020/0068416 A1* | 2/2020 | Kang | H04W 16/28 |
| 2020/0120714 A1* | 4/2020 | Wang | H04B 7/088 |
| 2020/0154485 A1* | 5/2020 | Gao | H04W 74/08 |
| 2020/0178338 A1* | 6/2020 | Ahn | H04B 7/0626 |

FOREIGN PATENT DOCUMENTS

| | | |
|---|---|---|
| WO | 2017024516 A1 | 2/2017 |
| WO | 2018233523 A1 | 12/2018 |

OTHER PUBLICATIONS

Translation of Written Opinion, dated Aug. 29, 2018, for corresponding PCT Application No. PCT/CN2018/091035, International Filing Date of Jun. 13, 2018 consisting of 3 pages.

International Search Report, dated Dec. 27, 2018, for corresponding PCT Application No. PCT/CN2018/091035, International Filing Date of Jun. 13, 2018 consisting of 3 pages.

Written Opinion, dated Dec. 27, 2018, for corresponding PCT Application No. PCT/CN2018/091035, International Filing Date of Jun. 13, 2018 consisting of 3 pages.

Translation of International Search Report, dated Aug. 29, 2018, for corresponding PCT Application No. PCT/CN2018/091035, International Filing Date of Jun. 13, 2018 consisting of 2 pages.

Extended European Search Report, dated May 12, 2020, for corresponding PCT Application No. PCT/CN2018/091035, International Filing Date of Jun. 13, 2018 consisting of 10 pages.

Catt, "Discussion on DL Beam Recovery," 3GPP TSG RAN WG1, Meeting #89, May 15-19, 2017, Hangzhou, China, consisting of 5 pages.

Vivo, "Beam Recovery Based on NR-PDCCH and NR-PDSCH," 3GPP TSG RAN WG1, Meeting #89, May 15-19, 2017, Hangzhou, China, consisting of 6 pages.

Zte, "Discussion on Beam Recovery Mechanism," 3GPP TSG RAN WG1 NR Ad-Hoc #2, Jun. 27-30, 2017 Qingdao, P.R. China, consisting of 9 pages.

Samsung, "NR Beam Recovery," 3GPP TSG RAN WG2 2017 RAN2, Meeting #98, May 15-19, 2017, Hangzhou, China, consisting of 5 pages.

Lenovo, Motorola Mobility, "Resource Configuration for Beam Failure Recovery Request," 3GPP TSG-RAN WG2, Meeting #AH, Jun. 27-29, 2017, Qingdao, China, consisting of 4 pages.

First Office Action, dated Nov. 20, 2019, for CN 201710466283.2, Priority date of Jun. 19, 2017, consisting of 10 pages.

Translation of First Office Action, dated Nov. 20, 2019, for CN 201710466283.2, Priority date of Jun. 19, 2017, consisting of 12 pages.

Translation of Search Report, dated Apr. 16, 2019, for CN 201710466283.2, Priority date of Jun. 19, 2017, consisting of 3 pages.

Search Report, dated Apr. 16, 2019, for CN 201710466283.2, Priority date of Jun. 19, 2017, consisting of 6 pages.

Liu Kun, et al., "Research on the Random Access Technology of LTE Based Satellite Mobile Communications," Radio Communications Technology, 2017, pp. 12-15, vol. 43, No. 2.

* cited by examiner

| Receiving configuration information of a Physical Random Access Channel (PRACH) resource transmitted by a network device | —11 |
FIG.1
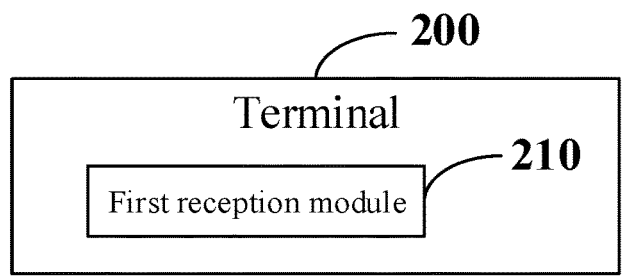
FIG.2
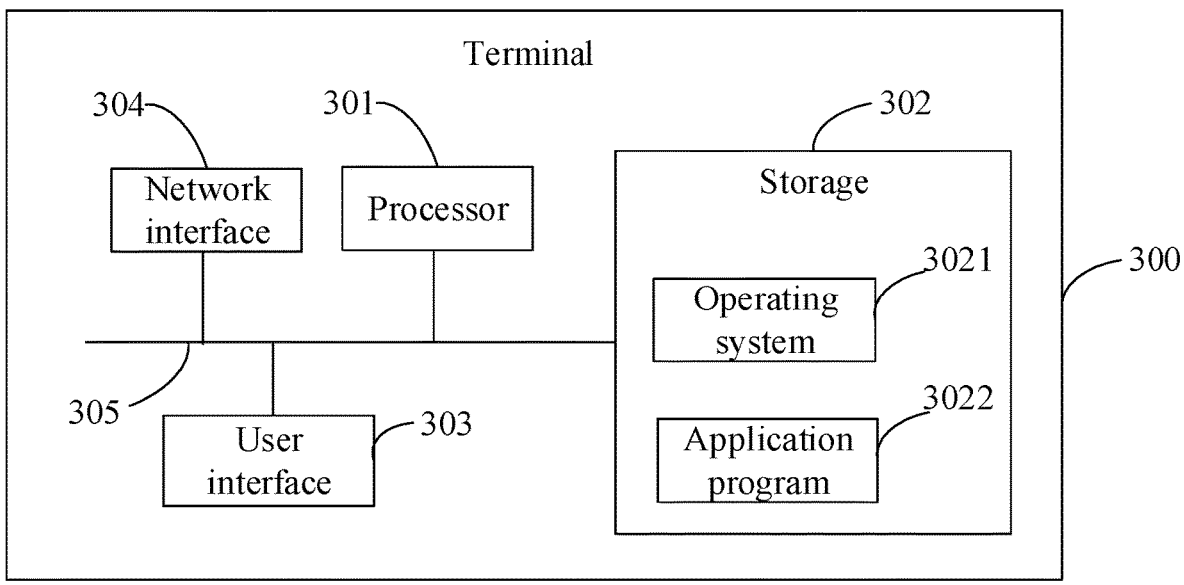
FIG.3
| Transmitting configuration information of a Physical Random Access Channel (PRACH) resource to at least one terminal | —41 |
FIG.4

METHOD OF CONFIGURING RANDOM ACCESS RESOURCE, TERMINAL, AND NETWORK NODE

CROSS-REFERENCE TO RELATED APPLICATION

This application is a U.S. national phase application of a PCT Application No. PCT/CN2018/091035 filed on Jun. 13, 2018, which claims a priority to a Chinese Patent Application No. 201710466283.2 filed in China on Jun. 19, 2017, the disclosures of which are incorporated in their entireties by reference herein.

TECHNICAL FIELD

The present disclosure relates to the field of communication technology, and, in particular, relates to a method of configuring a random access resource, a terminal, and a network node.

BACKGROUND

In a future 5th Generation (5G) mobile communication system, also referred to as a New Radio (NR) system, to achieve a goal of a downlink transmission rate of 20 Gbps and an uplink transmission rate of 10 Gbps, high frequency communication and a large-scale antenna technology will be introduced. In particular, the high frequency communication may provide a wider system bandwidth, and an antenna size may also be smaller, which are more advantageous for a deployment of a large-scale antenna in a base station and in a terminal. However, the high-frequency communication has disadvantages such as a high path loss, vulnerability to disturbances, and link vulnerability, etc., while the large-scale antenna technology may provide a large antenna gain. Therefore, a combination of the high frequency communication and the large-scale antenna technology is an inevitable trend of the future 5G mobile communication system.

However, the problem of link vulnerability in high-frequency communication still exists. In the related art, when a signal in the high-frequency communication is shielded, a beam failure recovery mechanism may be used to switch a beam, and a communication link is switched from a poor beam to a candidate beam with a better communication link, so as to avoid a wireless link from failing and effectively improve robustness of a link. Although transmission of a beam failure recovery request through a plurality of channels or signals is supported in the 5G systems, when the terminal communicates in a large-scale antenna system, beam failure may occur at any time, and the beam failure recovery request needs to be transmitted, but the network node cannot learn when a channel or a signal for transmitting the beam failure recovery request is configured for the terminal, causing that a fast beam failure recovery cannot be achieved.

SUMMARY

The present disclosure provides a method of configuring of a random access resource, a terminal, and a network node.

In a first aspect, the present disclosure provides a method of configuring a random access resource. The method is applied to a terminal and includes: receiving configuration information of a Physical Random Access Channel (PRACH) resource transmitted by a network node; wherein the configuration information is configured to indicate a PRACH transmission resource reserved by the network node for the terminal and used to transmit a beam failure recovery request.

In a second aspect, the present disclosure further provides a terminal. The terminal includes: a first reception module, configured to receive configuration information of a Physical Random Access Channel (PRACH) resource transmitted by a network node, wherein the configuration information is configured to indicate a PRACH transmission resource reserved by the network node for the terminal and used to transmit a beam failure recovery request.

In a third aspect, the present disclosure provides a terminal. The terminal includes a processor and a storage, wherein a computer program executable by the processor is stored in the storage, and when the computer program is executed by the processor, the processor implements steps of the method of configuring a random access resource according to the first aspect.

In a fourth aspect, the present disclosure provides a non-transitory computer-readable storage medium. The non-transitory computer-readable storage medium includes a computer program stored on the computer readable storage medium, wherein when the computer program is executed by the processor, the processor implements steps of the method of configuring a random access resource according to the first aspect.

In a fifth aspect, the present disclosure provides a method of configuring a random access resource. The method is applied to a network node and includes: transmitting configuration information of a Physical Random Access Channel (PRACH) resource to at least one terminal, wherein the configuration information is configured to indicate a PRACH transmission resource reserved by the network node for the terminal and used to transmit a beam failure recovery request.

In a sixth aspect, the present disclosure provides a network node. The network node includes: a second transmission module, configured to transmit configuration information of a Physical Random Access Channel (PRACH) resource to at least one terminal, wherein the configuration information is configured to indicate a PRACH transmission resource reserved by the network node for the terminal and used to transmit a beam failure recovery request.

In a seventh aspect, the present disclosure provides a network node. The network node includes a processor and a storage, wherein a computer program executable on the processor is stored in the storage, when the computer program is executed by the processor, the processor implements steps of the method of configuring a random access resource according to the fifth aspect.

In an eighth aspect, the present disclosure provides a non-transitory computer-readable storage medium. The non-transitory computer-readable storage medium includes a computer program stored on the computer readable storage medium, wherein when the computer program is executed by the processor, the processor implements steps of the method of configuring a random access resource according to the fifth aspect.

BRIEF DESCRIPTION OF THE DRAWINGS

In order to more clearly illustrate the technical solution of the present disclosure, the drawings to be used in the description of the present disclosure will be briefly described below. Obviously, the drawings in the following description are only some of the embodiments of the present disclosure, and those skilled in the art may acquire other drawings according to the drawings without paying creative effort.

FIG. 1 is a schematic flowchart diagram illustrating a method of configuring a random access resource applied to a terminal provided by some embodiments of the present disclosure;

FIG. 2 is a schematic diagram illustrating modules in a terminal provided by some embodiments of the present disclosure;

FIG. 3 is a block diagram illustrating a terminal provided by some embodiments of the present disclosure;

FIG. 4 is a schematic flowchart diagram illustrating a method of configuring a random access resource applied to a network node provided by some embodiments of the present disclosure;

DETAILED DESCRIPTION

Figure 5:
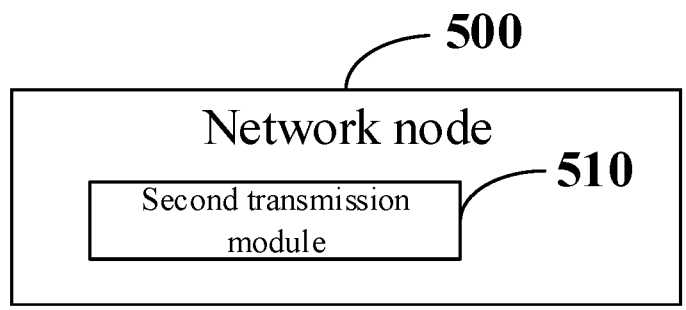
FIG. 5 is a schematic diagram illustrating modules in a network node provided by some embodiments of the present disclosure.

Exemplary embodiments of the present disclosure will be described below in more detail with reference to the accompanying drawings. Although the exemplary embodiments of the present disclosure are shown in the drawings, however it should be understood that the present disclosure may be implemented in various forms and should not be limited to the embodiments described herein. Rather, these embodiments are provided so that the present disclosure may be more thoroughly understood and will fully convey the scope of the present disclosure to those skilled in the art.

Such terms as "first", "second", and the like in the specification and claims of the present disclosure are used to distinguish similar objects, and are not necessarily used to describe a particular order or a chronological order. It is to be understood that terms used in the above way may be interchangeable under appropriate circumstances, so that the embodiments of the present application described herein may be implemented in a sequence other than those illustrated or described herein. In addition, such terms "comprise" and "have" and any variants thereof are intended to cover non-exclusive inclusions, for example, a process, method, system, product, or device that includes a series of steps or units is not necessarily limited to those steps or units clearly listed, but may include other steps or units not explicitly listed or inherent to such process, method, product or device.

"Feature A and/or feature B" as referred to in the specification and claims of the present disclosure means "at least one of feature A and feature B" or "at least one of feature A or feature B", such as presence of the feature A, or presence of the feature B, or presence of both the feature A and the feature B.

The method of configuring a random access resource, a terminal, and a network node provided by the present disclosure may solve a problem that fast beam failure recovery cannot be achieved because a network node cannot know when a channel or a signal for transmitting a beam failure recovery request is configured for a terminal.

The present disclosure provides a method of configuring a random access resource, and the method is applied to a terminal. As shown in FIG. 1, the method specifically includes a following step 11.

Step 11: receiving configuration information of a Physical Random Access Channel (PRACH) resource transmitted by a network node.

The configuration information is configured to indicate a transmission resource of a Physical Random Access Channel (PRACH) reserved by the network node for the terminal and used to transmit a beam failure recovery request. Further, in a future 5th Generation (5G) New Radio (NR) system, the Physical Random Access Channel may also be referred to as a New Radio Physical Random Access Channel (NR-PRACH).

It should be noted that a part of PRACH resources configured by the network node are used for a normal random access procedure of the terminal for a purpose other than a beam failure recovery, and another part of the resources are used for the terminal to transmit a beam failure recovery request when a beam fails, and the two parts of the resources are orthogonal, that is, the PRACH resources used for transmitting the beam failure recovery request are orthogonal (including orthogonal in a time domain, orthogonal in a frequency domain, and/or orthogonal in a code domain) to the PRACH resources used for the normal random access procedure. It should be noted that the PRACH resource mentioned herein may be a non-contention-based PRACH resource or a contention-based PRACH resource. In addition, the PRACH resources used for transmitting the beam failure recovery request are always reserved for the terminal. Before the resources are released or deactivated, the part of the PRACH resources cannot be used by a random access procedure for another purpose, thereby reducing a signaling process for configuring the PRACH each time, and reducing unnecessary signaling interactions.

Specifically, the step 11 specifically includes: receiving, by the terminal, configuration information of a Physical Random Access Channel (PRACH) resource transmitted by the network node at preset time. In order to ensure that the terminal performs a beam failure recovery procedure immediately after a beam failure is detected, the preset time may include at least one of following: a first preset time duration prior to a start of service transmission, a second preset time duration after the start of service transmission, and time when a beam failure is detected for a first time after an access of the terminal is completed. That is, within a preset time duration after the network node detects a service request (that is, within the first preset time duration prior to a start of service transmission), or within a preset time duration after the network node detects a service starts to be transmitted (that is, within the second preset time duration after the start of the service transmission), the configuration information may be transmitted to the terminal to prevent the terminal from having no transmission resource for transmitting the beam failure recovery request after the terminal detects the beam failure. Optionally, when the beam failure occurs for the first time after the terminal is connected to the network node, the terminal requests the network node to configure a transmission resource for the corresponding beam failure recovery request. In such a case, the network node transmits corresponding resource configuration information, and a resource is always reserved for the terminal to perform transmission of a beam failure recovery request until the resource is deactivated or released.

In addition, the step 11 includes two manners of passive reception and active request. The manner of active request specifically includes: transmitting, by the terminal, request information for requesting a PRACH resource to the network node; and receiving, by the terminal, configuration information of the PRACH resource transmitted by the network node according to the request information.

Further, a specific receiving process after the passive reception and the active request in the foregoing step 11 may be implemented by following steps: receiving, through a preset downlink information, the configuration information of the Physical Random Access Channel (PRACH) resource transmitted by the network node. The downlink information includes at least one of: a broadcast message, a system message, a Radio Resource Control (RRC) configuration message, a Radio Resource Control (RRC) reconfiguration message, and control information corresponding to a Physical Downlink Control Channel (PDCCH). That is, the network node may configure the configuration information of the PRACH resource by using at least one of the broadcast message, the system message, the RRC configuration, the RRC reconfiguration, and a PDCCH instruction. The configured PRACH resource is used only for transmitting the beam failure recovery request, which is different from a resource used in the normal random access procedure.

Specifically, the configuration information includes: time domain information and/or frequency domain information for carrying a beam failure recovery request. The time domain information and the frequency domain information indicate a random access time-domain resource or a random access frequency-domain resource used for carrying the beam failure recovery request.

In addition, the configuration information further includes: information of a preamble sequence code for carrying the beam failure recovery request, and/or grouping information of preamble sequence codes. The preamble sequence code and/or the grouping information of preamble sequence codes are pre-agreed in a protocol; or, the preamble sequence code and/or the grouping information of preamble sequence codes is configured by the network node for the terminal.

The preamble sequence code includes a part of preamble sequence codes within a first predetermined group and/or a part of preamble sequence codes within a second predetermined group. It should be noted that, the first predetermined group and the second predetermined group referred to herein are groups pre-agreed in a protocol, specifically, which are a group A and a group B of preamble sequence codes, wherein the group A and the group B respectively represent a channel quality of the terminal, or a distance between the network node and the terminal.

Further, the grouping information of preamble sequence codes is used to indicate whether a preamble sequence code within a current group is used for transmitting the beam failure recovery request. That is, in the grouping information of preamble sequence codes pre-agreed in a protocol or configured by the network node, for example, the preamble sequence code within a certain group is used only for the beam failure recovery request, and when the network node configures, for the terminal, a random access procedure for a purpose of the beam failure recovery request, only the preamble sequence code in the group is used. It should be noted that, for a non-contention-based random access channel, the network node configures a separate preamble sequence code for each terminal, and the grouping information of preamble sequence codes may reduce configuration processes for terminals one by one for a contention-based random access channel.

Further, since the PRACH resource indicated in the configuration information received by the terminal is reserved, when the number of terminals is large or a probability of a beam failure in the terminal is small, in order to reduce unnecessary resource waste, the method further includes a following step after the step 11 of the present disclosure: receiving, by the terminal, an Activation instruction or a Deactivation instruction transmitted by the network node. The Activation instruction is used to activate a PRACH resource, and the Deactivation instruction is used to deactivate the PRACH resource. Specifically, when the terminal receives the Activation instruction, the terminal may activate a PRACH resource corresponding to the Activation instruction, and the activated PRACH resource may be used to transmit a beam failure recovery request. When the terminal receives the deactivation instruction, the terminal may deactivate a PRACH resource corresponding to the deactivation instruction, and the deactivated PRACH resource may not be used for a current transmission of a beam failure recovery request of the terminal. Optionally, after the terminal receives the activation instruction or the deactivation instruction transmitted by the network node, the terminal feeds back an acknowledgement (ACK) message/a non-acknowledgement (NACK) message to the network node according to the activation instruction or the deactivation instruction.

Further, the step of receiving an activation instruction or a deactivation instruction transmitted by the network node may include an explicit transmission manner and an implicit transmission manner, wherein, a process of the explicit transmission manner includes: receiving, through a physical downlink control channel or a Radio Resource Control (RRC) signaling, the activation instruction or the deactivation instruction transmitted by the network node. A process of the implicit transmission manner includes: acquiring an information element (IE) attribute of the configuration information; wherein the IE attribute implicitly carries the activation instruction or the deactivation instruction. Each IE attribute includes Specified, Maintain or Release, and the terminal may implicitly acquire the activation instruction or the deactivation instruction by using the IE attribute of the above configuration information and a corresponding Field description. For example, when the IE attribute of the above configuration information is the Maintain, the activation instruction is implicitly indicated.

After the terminal receives the configuration information transmitted by the network node, or after the terminal receives the configuration information and the activation instruction transmitted by the network node, the method further includes: transmitting the beam failure recovery request to the network node through the PRACH resource, in a case that a beam failure is detected. If the terminal detects a condition of the beam failure, the terminal transmits the beam failure recovery request to the network node by using the PRACH resource configured by the network node. It should be noted that, transmission of the recovery request may be the contention-based random access or the non-contention-based random access.

Further, in order to reasonably configure a transmission resource, the network node may release a configured resource according to actual needs. Specifically, after the step 11, the method further includes: receiving, by the terminal, a Release instruction transmitted by the network node. The Release instruction is used to release the PRACH resource. That is, when the terminal receives the release instruction transmitted by the network node, the terminal releases a corresponding PRACH resource, so that the network node configures a part of the resource to other terminals or other random access procedures for other purposes. Specifically, the step of receiving a Release instruction transmitted by the network node includes: receiving the Release instruction transmitted by the network node after service transmission is completed.

Further, similar to receiving the activation instruction or the deactivation instruction transmitted by the network node, the step of receiving a Release instruction transmitted by the network node, includes: receiving, through a physical downlink control channel or a Radio Resource Control (RRC) signaling, the release instruction transmitted by the network node; or, acquiring an information element (IE) attribute of the configuration information; wherein the IE attribute implicitly carries the release instruction. Each IE attribute includes Specified, Maintain or Release, and the terminal may implicitly acquire the release instruction through the IE attribute of the above configuration information and the corresponding Field description. For example, in a case that the IE attribute of the above configuration information is the Release, the release instruction is implicitly indicated.

A configuration flow of the present disclosure and information and a function carried by configuration information involved in the configuration flow are described above. The method of configuring the random access resource of the present disclosure will be further described below in conjunction with a specific application scenario.

A First Scenario

Step a1: receiving, by the terminal, configuration information of a Physical Random Access Channel (PRACH) resource transmitted by the network node. The PRACH resource takes effect immediately after being configured, and is reserved persistently.

Step a2: after the terminal detects the beam failure, transmitting, by the terminal, a beam failure recovery request to the network node by using the foregoing PRACH resource.

Step a3: receiving, by the terminal, a release instruction transmitted by the network node. After the release instruction is received, the PRACH resource is no longer occupied.

A Second Scenario

Step b1: receiving, by the terminal, configuration information of a Physical Random Access Channel (PRACH) resource transmitted by the network node. The PRACH resource does not take effect after being configured, and takes effect only after an activation instruction is received.

Step b2: receiving, by the terminal, the activation instruction transmitted by the network node. After the activation instruction is received, the corresponding PRACH resource takes effect and may be used for transmitting the beam failure recovery request.

Step b3: after the terminal detects the beam failure, transmitting, by the terminal, a beam failure recovery request to the network node by using the foregoing PRACH resource.

Step b4: receiving, by the terminal, a deactivation instruction transmitted by the network node. After the deactivation instruction is received, the corresponding PRACH resource is not used but is not released, and is not available for current transmission of the beam failure recovery request by the terminal. It should be noted that transmission of the above-mentioned activation instruction and the deactivation instruction may be performed for many times repeatedly and/or alternately.

Step b5: receiving, by the terminal, a release instruction transmitted by the network node. After the release instruction is received, the transmission resource is no longer occupied.

A Third Scenario

Step c1: receiving, by the terminal, configuration information of a Physical Random Access Channel (PRACH) resource transmitted by the network node. The PRACH resource takes effect immediately after being configured, and is reserved persistently.

Step c2: after the terminal detects the beam failure, transmitting, by the terminal, a beam failure recovery request to the network node by using the foregoing PRACH resource.

Step c3: receiving, by the terminal, the deactivation instruction transmitted by the network node. After the deactivation instruction is received, the corresponding PRACH resource is not used but is not released, and is not available for current transmission of the beam failure recovery request by the terminal.

Step c4: receiving, by the terminal, the activation instruction transmitted by the network node. After the activation instruction is received, the corresponding PRACH resource takes effect, and may be used for transmitting the beam failure recovery request. Transmission of the above-mentioned activation instruction and the deactivation instruction may be performed for many times and repeatedly and/or alternately.

Step c5: receiving, by the terminal, a release instruction transmitted by the network node. After the release instruction is received, the transmission resource is no longer occupied.

A Fourth Scenario

Step d1: receiving, by the terminal, configuration information of a Physical Random Access Channel (PRACH) resource transmitted by the network node. The PRACH resource takes effect immediately after being configured, and is reserved persistently.

Step d2: after the terminal detects the beam failure, transmitting, by the terminal, a beam failure recovery request to the network node by using the foregoing PRACH resource.

Step d3: receiving, by the terminal, a deactivation instruction transmitted by the network node. After the deactivation instruction is received, the corresponding PRACH resource is not used but is not released, and is not available for current transmission of the beam failure recovery request by the terminal; or a following step d4 is executed.

Step d4: receiving, by the terminal, a release instruction transmitted by the network node. After the release instruction is received, the transmission resource is no longer occupied.

A Fifth Scenario

Step e1: receiving, by the terminal, configuration information of a Physical Random Access Channel (PRACH) resource transmitted by the network node. The PRACH resource does not take effect after being configured, but takes effect only after an activation instruction is received.

Step e2: receiving, by the terminal, an activation instruction transmitted by the network node. After the activation instruction is received, the corresponding PRACH resource takes effect and may be used for transmitting the beam failure recovery request.

Step e3: after the terminal detects the beam failure, transmitting, by the terminal, a beam failure recovery request to the network node by using the foregoing PRACH resource.

Step e4: receiving, by the terminal, the deactivation instruction transmitted by the network node. After the deactivation instruction is received, the corresponding PRACH resource is not used but is not released, and is not available for current transmission of the beam failure recovery request by the terminal; or, a following step e5 is executed.

Step e5: receiving, by the terminal, a release instruction transmitted by the network node. After the release instruction is received, the transmission resource is no longer occupied.

A Sixth Scenario

Step f1: receiving, an activation instruction, transmitted by a network node and used to activate a random access (PRACH) resource. The random access resource is a transmission resource that is pre-agreed by the protocol and used for transmission of a beam failure recovery request.

Step f2: after the terminal detects the beam failure, transmitting, by the terminal, a beam failure recovery request to the network node by using the foregoing PRACH resource.

Step f3: receiving, by the terminal, a deactivation instruction transmitted by the network node. After the deactivation instruction is received, the corresponding PRACH resource is not used but is not released, and is not available for current transmission of the beam failure recovery request by the terminal; or a following step f4 is executed.

Step f4: receiving, by the terminal, a release instruction transmitted by the network node. After the release instruction is received, the transmission resource is no longer occupied.

In the method of configuring a random access resource of the present disclosure, by receiving the configuration information of a physical random access channel resource transmitted by the network node, the terminal may transmit a beam failure recovery request to the network node directly through the corresponding resource after detecting the beam failure, thereby achieving a fast recovery of the beam failure.

The methods for configuring a random access resource in different scenarios are described in detail above. The corresponding terminals are further introduced hereinafter with reference to the accompanying drawings.

As shown in FIG. 2, the terminal 200 of the present disclosure may implement details of the above method of receiving the configuration information of the Physical Random Access Channel (PRACH) resource transmitted by the network node, and achieve the same effect. The configuration information is configured to indicate a transmission resource of a PRACH reserved by the network node for the terminal and used to transmit a beam failure recovery request.

The terminal 200 specifically includes following functional modules: a first reception module 210, configured to receive configuration information of a Physical Random Access Channel (PRACH) resource transmitted by a network node, wherein the configuration information is configured to indicate a transmission resource of a PRACH reserved by the network node for the terminal and used to transmit a beam failure recovery request.

The first reception module 210 includes: a first reception submodule, configured to receive configuration information of a Physical Random Access Channel (PRACH) resource transmitted by the network node at preset time; wherein, the preset time includes at least one of following: a first preset time duration prior to a start of service transmission, a second preset time duration after the start of service transmission, and time when a beam failure is detected for a first time after an access of the terminal is completed.

The first reception module 210 includes: a first transmission submodule, configured to transmit request information for requesting a PRACH resource to the network node; and a second reception submodule, configured to receive the configuration information of the PRACH resource transmitted by the network node according to the request information.

The first reception module 210 includes: a third reception submodule, configured to receive, through preset downlink information, the configuration information of the Physical Random Access Channel (PRACH) resource transmitted by the network node; wherein, the downlink information includes at least one of: a broadcast message, a system message, a Radio Resource Control (RRC) configuration message, a Radio Resource Control (RRC) reconfiguration message, and control information corresponding to a Physical Downlink Control Channel (PDCCH).

The configuration information further includes: information of a preamble sequence code for carrying the beam failure recovery request, and/or grouping information of preamble sequence codes.

The preamble sequence code includes a part of preamble sequence codes within a first predetermined group and/or a part of preamble sequence codes within a second predetermined group.

The grouping information is used to indicate whether a preamble sequence code within a current group is used for transmitting the beam failure recovery request or not.

The preamble sequence code and/or the grouping information of preamble sequence codes are pre-agreed in a protocol.

The terminal further includes: a second reception module, configured to receive an activation instruction or a deactivation instruction transmitted by the network node; wherein the activation instruction is used to activate a PRACH resource, and the deactivation instruction is used to deactivate a PRACH resource.

The second reception module includes: a fourth reception submodule, configured to receive, through a physical downlink control channel or a Radio Resource Control (RRC) signaling, the activation instruction or the deactivation instruction transmitted by the network node.

The second reception module includes: a first acquisition submodule, configured to acquire an information element (IE) attribute of the configuration information; wherein the IE attribute implicitly carries the activation instruction or the deactivation instruction.

The second reception module further includes: a feedback submodule, configured to feed back an acknowledgement (ACK) message/a non-acknowledgement (NACK) message to the network node according to the activation instruction or the deactivation instruction.

The terminal further includes: a third reception module, configured to receive a release instruction transmitted by the network node; wherein the release instruction is used to release the PRACH resource.

The third reception module includes: a fifth reception submodule, configured to receive the release instruction transmitted by the network node after service transmission is completed.

The third reception module includes: a sixth reception submodule, configured to receive, through a physical downlink control channel or a Radio Resource Control (RRC) signaling, the release instruction transmitted by the network node.

The third reception module includes: a second acquisition submodule, configured to acquire an information element (IE) attribute of the configuration information; wherein the IE attribute implicitly carries the release instruction.

The terminal further includes: a first transmission module, configured to transmit the beam failure recovery request to the network node through the PRACH resource, when a beam failure is detected.

It should be noted that, the terminal of the present disclosure, by receiving the configuration information of the physical random access channel resource transmitted by the network node, may transmit a beam failure recovery request to the network node directly through the corresponding resource after the beam failure is detected, thereby achieving a fast recovery of the beam failure.

In order to better achieve the above purpose, the present disclosure also provides a network node including a processor and a storage, the storage is configured to store a computer program executable by the processor. When the computer program is executed by the processor, the processor implements the steps of the above method of configuring the random access resource as described above.

The present disclosure also provides a computer readable storage medium including a computer program stored thereon, and when the computer program is executed by a processor, the processor implements the steps of the above method of configuring the random access resource as described above. In the present disclosure, the computer readable storage medium may be volatile or non-volatile.

Specifically, FIG. 3 is a block diagram of a terminal 300 provided by some embodiments of the present disclosure. The terminal shown in FIG. 3 includes at least one processor 301, a storage 302, a user interface 303, and a network interface 304. Various components in terminal 300 are coupled together by a bus system 305. It will be appreciated that the bus system 305 is used to implement connection communication between these components. The bus system 305 includes a power bus, a control bus, and a status signal bus and a data bus. However, for clarity of description, the various buses are labeled as the bus system 305 in FIG. 3.

The user interface 303 may include a display or a pointing device (e.g., a touchpad or a touch screen, etc.)

It is to be understood that the storage 302 in the present disclosure may be a volatile storage or a non-volatile storage, or may include both the volatile storage and the non-volatile storage. The non-volatile storage may be a Read-Only Memory (ROM), a Programmable ROM (PROM), an Erasable PROM (EPROM), or an Electrically EPROM (EEPROM) or a flash memory. The volatile storage may be a Random Access Memory (RAM) that acts as an external cache. By way of example and not limitation, many forms of RAMS are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 302 in the systems and methods described herein is intended to include, but is not limited to, these and any other suitable types of memories.

In some embodiments, the storage 302 stores following elements, executable modules or data structures, or a subset thereof, or an extended set thereof: an operating system 3021 and an application program 3022.

The operating system 3021 includes various system programs, such as a framework layer, a core library layer, a driver layer, and the like, for implementing various basic services and processing hardware-based tasks. The application program 3022 includes various application programs, such as a Media Player, a Browser, and the like, for implementing various application services. A program implementing the methods of the present disclosure may be included in the application program 3022.

In an embodiment of the present disclosure, a computer program executable by the processor 301 is stored on the storage 302, and specifically may be a computer program in the application program 3022. When the processor 301 implements the computer program, the processor 301 implements following steps: receiving configuration information of a Physical Random Access Channel (PRACH) resource transmitted by a network node, wherein the configuration information is configured to indicate a transmission resource of a PRACH reserved by the network node for the terminal and used to transmit a beam failure recovery request.

The above method disclosed in the present disclosure may be applied to the processor 301 or implemented by the processor 301. The processor 301 may be an integrated circuit chip having a processing capability of signals. In an implementation process, each step of the foregoing method may be achieved by an integrated logic circuit of hardware in the processor 301 or an instruction in a form of software. The processor 301 may be a general-purpose processor, a Digital Signal Processor (DSP), an Application Specific Integrated Circuit (ASIC), a Field Programmable Gate Array (FPGA), other programmable logic devices, a discrete gate or transistor logic devices, or discrete hardware components. The methods, steps, and logical block diagrams disclosed in the present disclosure may be implemented or carried out. The general purpose processor may be a microprocessor, any conventional processor or the like. The steps of the method disclosed in connection with the present disclosure may be embodied directly by a hardware decoding processor, or be implemented by a combination of hardware in the hardware decoding processor and a software module. The software module may be in a conventional storage medium known in the art such as a random access memory, a flash memory, a read only memory, a programmable read only memory or an electrically erasable programmable memory, a register, and the like. The storage medium is in the storage 302, and the processor 301 reads information in the storage 302 and completes the steps of the above method in combination with hardware of the processor 301.

It is to be understood that the embodiments described herein may be implemented in hardware, software, firmware, middleware, microcode, or any combination thereof. For a hardware implementation, processing units may be implemented within one or more Application Specific Integrated Circuits (ASICs), Digital Signal Processors (DSPs), DSP devices (DSPDs), Programmable Logic Devices (PLDs), Field-Programmable Gate Arrays (FPGAs), general processors, controllers, micro-controllers, microprocessors, other electronic units designed to perform the functions described herein, or a combination thereof.

For a software implementation, techniques described herein may be implemented by modules (e.g., processes, functions, etc.) that perform the functions described herein. A software code may be stored in the storage and executed by the processor. The storage may be implemented within the processor or external to the processor.

Specifically, when the computer program is executed by the processor 301, the processor 301 may further implement a following step: receiving configuration information of a Physical Random Access Channel (PRACH) resource transmitted by the network node at preset time; wherein, the preset time includes at least one of following: a first preset time duration prior to a start of service transmission, a second preset time duration after the start of service transmission, and time when a beam failure is detected for a first time after an access of the terminal is completed.

Specifically, when the computer program is executed by the processor 301, the processor 301 may also implement the following steps: transmitting request information for requesting a PRACH resource to the network node; and receiving the configuration information of the PRACH resource transmitted by the network node according to the request information.

Specifically, when the computer program is executed by the processor 301, the processor 301 may also implement the following step: receiving, through preset downlink information, the configuration information of the Physical Random Access Channel (PRACH) resource transmitted by the network node; wherein, the downlink information includes at least one of: a broadcast message, a system message, a Radio Resource Control (RRC) configuration message, a Radio Resource Control (RRC) reconfiguration message, and control information corresponding to a Physical Downlink Control Channel.

The configuration information includes: information of a preamble sequence code for carrying the beam failure recovery request, and/or grouping information of preamble sequence codes.

The preamble sequence code includes a part of preamble sequence codes within a first predetermined group and/or a part of preamble sequence codes within a second predetermined group.

The grouping information is used to indicate whether a preamble sequence code within a current group is used for transmitting the beam failure recovery request or not.

The preamble sequence code and/or the grouping information of preamble sequence codes are pre-agreed in a protocol.

Specifically, when the computer program is executed by the processor 301, the processor 301 may also implement the following step: receiving an activation instruction or a deactivation instruction transmitted by the network node; wherein the activation instruction is used to activate a PRACH resource, and the deactivation instruction is used to deactivate a PRACH resource.

Specifically, when the computer program is executed by the processor 301, the processor 301 may also implement the following step: receiving, through a physical downlink control channel or a Radio Resource Control (RRC) signaling, the activation instruction or the deactivation instruction transmitted by the network node.

Specifically, when the computer program is executed by the processor 301, the processor 301 may also implement the following step: acquiring an information element (IE) attribute of the configuration information; wherein the IE attribute implicitly carries the activation instruction or the deactivation instruction.

Specifically, when the computer program is executed by the processor 301, the processor 301 may also implement the following step: feeding back an acknowledgement (ACK) message/a non-acknowledgement (NACK) message to the network node according to the activation instruction or the deactivation instruction.

Specifically, when the computer program is executed by the processor 301, the processor 301 may also implement the following step: receiving a release instruction transmitted by the network node; wherein the release instruction is used to release the PRACH resource.

Specifically, when the computer program is executed by the processor 301, the processor 301 may also implement the following step: receiving the release instruction transmitted by the network node after service transmission is completed.

Specifically, when the computer program is executed by the processor 301, the processor 301 may also implement the following step: receiving, through a physical downlink control channel or a Radio Resource Control (RRC) signaling, the release instruction transmitted by the network node.

Specifically, when the computer program is executed by the processor 301, the processor 301 may also implement the following step: acquiring an information element (IE) attribute of the configuration information; wherein the IE attribute implicitly carries the release instruction.

Specifically, when the computer program is executed by the processor 301, the processor 301 may also implement the following step: transmitting the beam failure recovery request to the network node through the PRACH resource, when a beam failure is detected.

The terminal may be a wireless terminal or a wired terminal, and the wireless terminal may be a device that provides voice and/or other service data connectivity to the user, a handheld device having a wireless connecting function, or another processing device connected to a wireless modem. The wireless terminal may communicate with one or more core networks via a Radio Access Network (RAN), and the wireless terminal may be a mobile terminal, such as a mobile phone (or referred to as "cellular" phone) and a computer having a mobile terminal, for example, a portable device, a pocket device, a handheld device, a computer built-in device or an in-vehicle mobile device that exchanges language and/or data with a wireless access network, for example, a Personal Communication Service (PCS) telephone, a cordless telephone, a Session Initiation Protocol (SIP) telephone, a Wireless Local Loop (WLL) station, a Personal Digital Assistant (referred to as PDA) and other devices. The wireless terminal may also be referred to as a system, a Subscriber Unit, a Subscriber Station, a Mobile Station, a Mobile, a Remote Station, a Remote Terminal, and an Access Terminal, a User Terminal, a User Agent, or a User Equipment or a User Device, which are not limited herein.

The terminal of the present disclosure, by receiving the configuration information of the physical random access channel resource transmitted by the network node, may transmit a beam failure recovery request to the network node directly through the corresponding resource after the beam failure is detected, thereby achieving a fast recovery of the beam failure.

The method of configuring the random access resource of the present disclosure at the terminal side is described above. The following further describes the method of configuring the random access resource at the network node side with reference to the accompanying drawings.

As shown in FIG. 4, FIG. 4 illustrates a method of configuring a random access resource applied to a network node provided by some embodiments of the present disclosure, and the method specifically includes the following step 41.

Step 41: transmitting configuration information of a Physical Random Access Channel (PRACH) resource to at least one terminal.

The configuration information is configured to indicate a transmission resource of a Physical Random Access Channel (PRACH) reserved by the network node for the terminal and used to transmit a beam failure recovery request. It should be noted that, a part of the PRACH resources configured by the network node are used for a normal random access procedure of the terminal for other purposes other than the beam failure recovery, and another part of the resources are used for the terminal to transmit a beam failure recovery request when a beam fails. The PRACH resource used for transmitting the beam failure recovery request is persistently reserved for the terminal. The part of the PRACH resources cannot be used by other random access procedures before a service of the terminal ends, thereby reducing the number of signaling processes for configuring the PRACH at each time, and reducing unnecessary signaling interactions.

The step 41 specifically includes: transmitting the configuration information of the Physical Random Access Channel (PRACH) resource to the at least one terminal at preset time. The preset time includes at least one of: a first preset time duration prior to a start of service transmission, a second preset time duration after the start of service transmission, and time when a beam failure is detected for a first time after an access of the terminal is completed. That is, within a preset time duration after the network node detects a service request (that is, within the first preset time duration prior to a start of service transmission), or within a preset time duration after the network node detects a service starts to be transmitted (that is, within the second preset time duration after the start of the service transmission), the configuration information may be transmitted to the terminal to prevent the terminal from having no transmission resource for transmitting the beam failure recovery request after the terminal detects the beam failure. Optionally, when the beam failure occurs for the first time after the terminal is connected to the network node, the terminal requests the network node to configure a transmission resource for the corresponding beam failure recovery request. In such a case, the network node transmits corresponding resource configuration information, and a resource is always reserved for the terminal to perform transmission of a beam failure recovery request.

The step 11 includes two manners of passive transmission and active transmission. The manner of passive transmission specifically includes: receiving request information for requesting a PRACH resource transmitted by at least one terminal; and transmitting configuration information of the corresponding PRACH resource to the terminal according to the request information.

A process of the active transmission or a process of passive transmission in the foregoing step 41 after the request is received may be implemented by following steps: transmitting, through preset downlink information, the configuration information of the Physical Random Access Channel (PRACH) resource to the at least one terminal. The downlink information includes at least one of: a broadcast message, a system message, a Radio Resource Control (RRC) configuration message, a Radio Resource Control (RRC) reconfiguration message, and control information corresponding to a Physical Downlink Control Channel (PDCCH). That is, the network node may configure the configuration information of the PRACH resource by using at least one of the broadcast message, the system message, the RRC configuration, the RRC reconfiguration, and a PDCCH instruction. The configured PRACH resource is used only for transmitting the beam failure recovery request, which is different from a resource used in the normal random access procedure.

Further, the configuration information includes: time domain information and/or frequency domain information for carrying a beam failure recovery request. The time domain information and the frequency domain information indicate a random access time-domain resource or a random access frequency-domain resource used for carrying the beam failure recovery request. In addition, the configuration information further includes: information of a preamble sequence code for carrying the beam failure recovery request, and/or grouping information of preamble sequence codes. The preamble sequence code and/or the grouping information of preamble sequence codes are pre-agreed in a protocol. The preamble sequence code includes a part of preamble sequence codes within a first predetermined group and/or a part of preamble sequence codes within a second predetermined group. It should be noted that, the first predetermined group and the second predetermined group referred to herein are groups pre-agreed in a protocol, specifically, which are a group A and a group B of preamble sequence codes, wherein the group A and the group B respectively represent a channel quality of the terminal, or a distance between the network node and the terminal.

In a case that the configuration information includes the grouping information of preamble sequence codes, before the step 41, the method further includes: grouping all preamble sequence codes to acquire grouping information of the preamble sequence codes. The grouping information is used to indicate whether preamble sequence codes within a current group are used for transmitting the beam failure recovery request or not. That is, in the grouping information of preamble sequence codes pre-agreed in a protocol or configured by the network node, for example, a preamble sequence code within a group is used only for the beam failure recovery request, and the network node only configures a preamble sequence code in the group for the terminal.

Further, specifically, when the number of terminals is large or a probability of a beam failure in the terminal is small, in order to reduce unnecessary resource waste, the method further includes a following step after the step 41: transmitting, by the network node, an Activation instruction or a Deactivation instruction to the terminal. The Activation instruction is used to activate a PRACH resource, and the Deactivation instruction is used to deactivate the PRACH resource. After transmitting the activation instruction or the deactivation instruction to the terminal, the method further includes: receiving an acknowledgement (ACK) message/a non-acknowledgement (NACK) message fed back by the terminal according to the activation instruction or the deactivation instruction.

The step of transmitting an activation instruction or a deactivation instruction to the terminal includes: transmitting the activation instruction or the deactivation instruction to the terminal through a physical downlink control channel or a Radio Resource Control (RRC) signaling. Optionally, the step of transmitting an activation instruction or a deactivation instruction to the terminal includes: implicitly transmitting, through an information element (IE) attribute of the configuration information, the activation instruction or the deactivation instruction to the terminal; wherein the IE attribute implicitly carries the activation instruction or the deactivation instruction.

After the network node transmits the configuration information, or after the network node transmits the configuration information and the activation instruction, when the terminal detects the beam failure, the network node receives the beam failure recovery request transmitted by the terminal after the terminal detects the beam failure.

Further, in order to reasonably configure transmission resources, the network node may release the configured resources according to actual needs. After the step 41, the method further includes: transmitting, to the terminal, a release instruction used to release the PRACH resource. Specifically, the network node transmits to the terminal a release instruction for releasing the PRACH resource after service transmission is completed. It should be noted that, the network node may also determine in advance when to release the PRACH resource of the terminal, the determination may be performed according to a current resource allocation situation, a current network transmission quality, and the like.

Specifically, the step of transmitting to the terminal a release instruction used to release the PRACH resource: transmitting, to the terminal through a physical downlink control channel or a Radio Resource Control (RRC) signaling, the release instruction used to release the PRACH resource. Optionally, similar to the process of transmitting an activation instruction or a deactivation instruction, the network node may also implicitly transmit, to the terminal through an information element (IE) attribute of the configuration information, the release instruction used to release the PRACH resource, wherein the IE attribute implicitly carries the release instruction.

In the method of configuring a random access resource of the present disclosure, the network node reserves, for the terminal, a random access channel resource persistently used for transmitting a beam failure recovery request, thereby reducing a signaling overhead of each configuration, and configures the random access resource to the terminal, so that when the terminal detects the beam failure, the terminal may directly report the beam failure recovery request through the corresponding resource to achieve a fast recovery of the beam failure.

The above describes the method of configuring a random access resource in different scenarios. A corresponding network node will be further described below with reference to the accompanying drawings.

As shown in FIG. 5, the network node 500 of the present disclosure may implement the details of the method of transmitting configuration information of a Physical Random Access Channel (PRACH) resource to at least one terminal in the foregoing embodiments, and achieve the same effect.

The configuration information is configured to indicate a transmission resource of a Physical Random Access Channel (PRACH) reserved by the network node for the terminal and used to transmit a beam failure recovery request. The network node 500 specifically includes the following functional modules: a second transmission module 510, configured to transmit configuration information of a Physical Random Access Channel (PRACH) resource to at least one terminal, wherein the configuration information is configured to indicate a transmission resource of a Physical Random Access Channel (PRACH) reserved by the network node for the terminal and used to transmit a beam failure recovery request.

The second transmission module 510 includes: a second transmission submodule, configured to transmit the configuration information of the Physical Random Access Channel (PRACH) resource to the at least one terminal at preset time. The preset time includes at least one of: a first preset time duration prior to a start of service transmission, a second preset time duration after the start of service transmission, and time when a beam failure is detected for a first time after an access of the terminal is completed.

The second transmission module 510 includes: a seventh reception submodule, configured to receive request information for requesting a PRACH resource transmitted by the at least one terminal; and a third transmission submodule, configured to transmit the configuration information of a corresponding PRACH resource to the terminal according to the request information.

The second transmission module 510 includes: a fourth transmission submodule, configured to transmit, through preset downlink information, the configuration information of the Physical Random Access Channel (PRACH) resource to the at least one terminal. The downlink information includes at least one of: a broadcast message, a system message, a Radio Resource Control (RRC) configuration message, a Radio Resource Control (RRC) reconfiguration message, and control information corresponding to a Physical Downlink Control Channel.

The configuration information includes: information of a preamble sequence code for carrying the beam failure recovery request, and/or grouping information of preamble sequence codes.

The network node further includes: a grouping module, configured to group all preamble sequence codes to acquire grouping information of the preamble sequence codes.

The preamble sequence code includes a part of preamble sequence codes within a first predetermined group and/or a part of preamble sequence codes within a second predetermined group.

The grouping information is used to indicate whether preamble sequence codes within a current group are used for transmitting the beam failure recovery request or not.

The preamble sequence code and/or the grouping information of preamble sequence codes are pre-agreed in a protocol.

The network node further includes: a third transmission module, configured to transmit an activation instruction or a deactivation instruction to the terminal; wherein the activation instruction is used to activate the PRACH resource, and the deactivation instruction is used to deactivate the PRACH resource.

The third transmission module includes: a fifth transmission submodule, configured to transmit, through a physical downlink control channel or a Radio Resource Control (RRC) signaling, the activation instruction or the deactivation instruction to the terminal.

The third transmission module includes: a sixth transmission submodule, configured to implicitly transmit, through an information element (IE) attribute of the configuration information, the activation instruction or the deactivation instruction to the terminal; wherein the IE attribute implicitly carries the activation instruction or the deactivation instruction.

The network node further includes: a fourth reception module, configured to receive an acknowledgement (ACK) message/a non-acknowledgement (NACK) message fed back by the terminal according to the activation instruction or the deactivation instruction.

The network node further includes: a fourth transmission module, configured to transmit, to the terminal, a release instruction used to release the PRACH resource.

The fourth transmission module includes: a seventh transmission submodule, configured to transmit, to the terminal after the service transmission is completed, the release instruction used to release the PRACH resource.

The fourth transmission module includes: an eighth transmission module, configured to transmit, to the terminal through a physical downlink control channel or a Radio Resource Control (RRC) signaling, the release instruction used to release the PRACH resource.

The fourth transmission module includes: a ninth transmission module, configured to implicitly transmit, to the terminal through an information element (IE) attribute of the configuration information, the release instruction used to release the PRACH resource, wherein the IE attribute implicitly carries the release instruction.

The network node further includes: a fifth reception module, configured to receive a beam failure recovery request transmitted by the terminal after beam failure is detected.

It should be noted that, the network node of the present disclosure reserves, for the terminal, a random access channel resource persistently used for transmitting a beam failure recovery request, thereby reducing a signaling overhead of each configuration, and configures the random access resource to the terminal, so that when the terminal detects the beam failure, the terminal may directly report the beam failure recovery request through the corresponding resource to achieve a fast recovery of the beam failure.

It should be noted that a division of modules of the above network node and terminal is only a division in terms of logical functions. In actual implementation, the modules may be entirely or partially integrated into one physical entity, or may be physically separated. The modules may all be implemented in a form of software called by a processing component; or may all be implemented in a form of hardware. Optionally, some of the modules may be implemented in the form of software called by a processing component, and some of the modules are implemented in the form of hardware. For example, the determination module may be a processing component arranged independently, or may be integrated in a chip of the above-mentioned devices. The determination module may also be stored in the storage of the above device in a form of program codes called and executed by a processing component of the above device to implement the function of the determination module. Implementation of other modules is similar. In addition, all or a part of these modules may be integrated or implemented independently. The processing components described herein may be an integrated circuit having a processing capability of signals. In an implementation process, each step of the above method or each of the above modules may be completed by an integrated logic circuit in hardware in the processor component or by an instruction in a form of software.

For example, the above modules may be one or more integrated circuits configured to implement the above method, such as one or more Application Specific Integrated Circuits (ASICs), or one or more digital signal processors (DSP), or, one or more Field Programmable Gate Arrays (FPGAs), etc. As another example, when one of the above modules is implemented in a form of program codes invoked by a processing component, the processing component may be a general purpose processor, such as a Central Processing Unit (CPU) or another processor capable of calling the program codes. As another example, these modules may be integrated and implemented in a form of a 'system-on-a-chip' (SOC).

In order to better achieve the above purpose, the present disclosure also provides a network node including a processor and a storage, the storage stores a computer program executable by the processor. When the computer program is executed by the processor, the processor implements the steps of the method of configuring the random access resource applied to the network node as described above.

The present disclosure also provides a computer readable storage medium including a computer program stored thereon. When the computer program is executed by the processor, the processor implements the steps of the method of configuring the random access resource as described above. The computer readable storage medium may be volatile or non-volatile.

Figure 6:
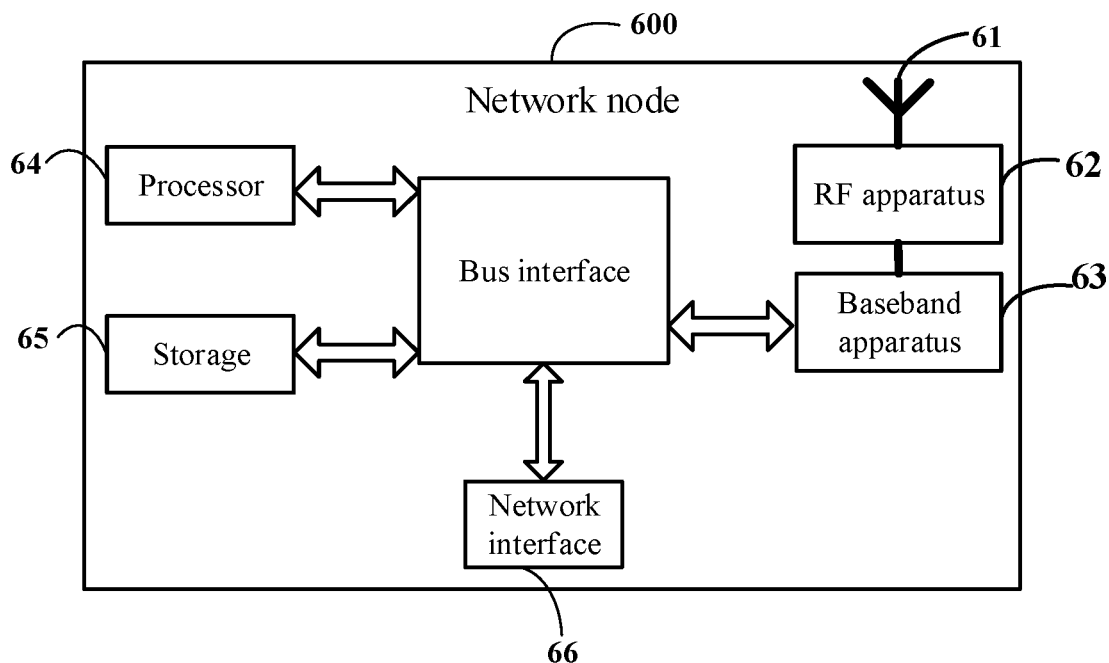
FIG. 6 is a block diagram illustrating a network node provided by some embodiments of the present disclosure.

Specifically, the present disclosure also provides a network node, as shown in FIG. 6, the network node 600 includes: an antenna 61, a radio frequency apparatus 62, and a baseband apparatus 63. The antenna 61 is connected to the radio frequency apparatus 62. In an uplink direction, the radio frequency apparatus 62 receives information via the antenna 61 and transmits the received information to the baseband apparatus 63 for processing. In a downlink direction, the baseband apparatus 63 processes information to be transmitted and transmits it to the radio frequency apparatus 62. The radio frequency apparatus 62 processes the received information and transmits it via the antenna 61.

The frequency band processing device may be arranged in the baseband apparatus 63, and the method performed by the above network node may be implemented in the baseband apparatus 63, which includes a processor 64 and a storage 65.

The baseband apparatus 63 may include, for example, at least one baseband board on which a plurality of chips are disposed, as shown in FIG. 6, and one of the chips is, for example, the processor 64 connected to the storage 65 to call a program in the storage 65 to perform an operation of the network node shown in the above method embodiment.

The baseband apparatus 63 may further include a network interface 66 for interacting with the radio frequency apparatus 62, and the interface is, for example, a common public radio interface (referred to as CPRI).

The processor here may be a processor or a collective name of a plurality of processing components. For example, the processor may be a CPU, an ASIC, or one or more integrated circuits configured to implement the method performed by the above network node, such as one or more digital signal processors (DSPs), or one or more field programmable gate arrays (FPGAs), etc. The storage element may be a storage or a collective name of a plurality of storage elements.

The storage 65 may be either a volatile storage or a non-volatile storage, or may include both the volatile storage and the non-volatile storage. The non-volatile storage may be a Read-Only Memory (ROM), a Programmable ROM (PROM), an Erasable PROM (EPROM), an Electrically EPROM (EEPROM) or a flash memory. The volatile storage may be a Random Access Memory (RAM) that acts as an external cache. By way of example and not limitation, many forms of RAMS are available, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM) and a Direct Rambus RAM (DRRAM). The storage 65 described herein is intended to include, but is not limited to, these and any other suitable types of storages.

In particular, the network node of the present disclosure further includes: a computer program stored on the storage 65 and executable by the processor 64. When the computer program is called by the processor 64, the processor 64 performs the method performed by the various modules shown in FIG. 5.

Specifically, when the computer program is called by the processor 64, the processor 64 may be used to execute: transmitting, configuration information of a Physical Random Access Channel (PRACH) resource to at least one terminal; wherein the configuration information is configured to indicate a transmission resource of a Physical Random Access Channel (PRACH) reserved by the network node for the terminal and used to transmit a beam failure recovery request.

Specifically, when the computer program is called by the processor 64, the processor 64 may be used to execute: transmitting the configuration information of the Physical Random Access Channel (PRACH) resource to the at least one terminal at preset time, wherein the preset time includes at least one of: a first preset time duration prior to a start of service transmission, a second preset time duration after the start of service transmission, and time when a beam failure is detected for a first time after an access of the terminal is completed.

Specifically, when the computer program is called by the processor 64, the processor 64 may be used to execute: receiving request information for requesting a PRACH resource transmitted by at least one terminal; and transmitting configuration information of the corresponding PRACH resource to the terminal according to the request information.

Specifically, when the computer program is called by the processor 64, the processor 64 may be used to execute: transmitting, through preset downlink information, the configuration information of the Physical Random Access Channel (PRACH) resource to the at least one terminal, wherein, the downlink information includes at least one of: a broadcast message, a system message, a Radio Resource Control (RRC) configuration message, a Radio Resource Control (RRC) reconfiguration message, and control information corresponding to a Physical Downlink Control Channel.

The configuration information further includes: information of a preamble sequence code for carrying the beam failure recovery request, and/or grouping information of preamble sequence codes.

Specifically, when the computer program is called by the processor 64, the processor 64 may be used to execute: grouping all preamble sequence codes to acquire grouping information of the preamble sequence codes.

Specifically, the preamble sequence code includes a part of preamble sequence codes within a first predetermined group and/or a part of preamble sequence codes within a second predetermined group.

The grouping information is used to indicate whether preamble sequence codes within a current group are used for transmitting the beam failure recovery request or not.

The preamble sequence code and/or the grouping information of preamble sequence codes are pre-agreed in a protocol.

Specifically, when the computer program is called by the processor 64, the processor 64 may be used to execute: transmitting an activation instruction or a deactivation instruction to the terminal; wherein the activation instruction is used to activate the PRACH resource, and the deactivation instruction is used to deactivate the PRACH resource.

Specifically, when the computer program is called by the processor 64, the processor 64 may be used to execute: transmitting, through a physical downlink control channel or a Radio Resource Control (RRC) signaling, the activation instruction or the deactivation instruction to the terminal.

Specifically, when the computer program is called by the processor 64, the processor 64 may be used to execute: implicitly transmitting, through an information element (IE) attribute of the configuration information, the activation instruction or the deactivation instruction to the terminal; wherein the IE attribute implicitly carries the activation instruction or the deactivation instruction.

Specifically, when the computer program is called by the processor 64, the processor 64 may be used to execute: receiving an acknowledgement (ACK) message/a non-acknowledgement (NACK) message fed back by the terminal according to the activation instruction or the deactivation instruction.

Specifically, when the computer program is called by the processor 64, the processor 64 may be used to execute: transmitting, to the terminal, a release instruction used to release the PRACH resource.

Specifically, when the computer program is called by the processor 64, the processor 64 may be used to execute: transmitting, to the terminal after the service transmission is completed, the release instruction used to release the PRACH resource.

Specifically, when the computer program is called by the processor 64, the processor 64 may be used to execute: transmitting, to the terminal through a physical downlink control channel or a Radio Resource Control (RRC) signaling, the release instruction used to release the PRACH resource.

Specifically, when the computer program is called by the processor 64, the processor 64 may be used to execute: implicitly transmitting, to the terminal through an information element (IE) attribute of the configuration information, the release instruction used to release the PRACH resource, wherein the IE attribute implicitly carries the release instruction.

Specifically, when the computer program is called by the processor 64, the processor 64 may be used to execute: receiving a beam failure recovery request transmitted by the terminal after a beam failure is detected.

The network node may be a Base Transceiver Station (BTS) in a Global System of Mobile communication (GSM) or a Code Division Multiple Access (CDMA) system, a NodeB (NB) in a Wideband Code Division Multiple Access (WCDMA) system, an Evolutional Node B (eNB or eNodeB), a relay station or an access point in a LTE system, or a base station in a further 5G network, or the like, which is not limited thereto.

In this way, the network node reserves, for the terminal, a random access channel resource persistently used for transmitting a beam failure recovery request, thereby reducing a signaling overhead of each configuration, and configures the random access resource to the terminal, so that when the terminal detects the beam failure, the terminal may directly report the beam failure recovery request through the corresponding resource to achieve a fast recovery of the beam failure.

Those of ordinary skills in the art will appreciate that elements and algorithm steps of various examples described in the embodiments disclosed herein may be implemented in electronic hardware or a combination of computer software and electronic hardware. Whether these functions are performed in hardware or software depends on a specific application and design constraints of a technical solution. A person skilled in the art may use different methods to implement described functions for each particular application, but such implementation should not be considered to be beyond the scope of the present disclosure.

A person skilled in the art may clearly understand that for convenience and brevity of the description, a specific working process of the system, the device and the unit described above may be obtained by referring to a corresponding process in the foregoing method embodiments, and details thereof are not described herein again.

In the embodiments provided by the present application, it should be understood that the disclosed devices and methods may be implemented in other manners. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

Units described as separate components may or may not be physically separated, and the components displayed as units may or may not be physical units, that is, may be located in one place, or may be distributed on multiple network units. Some or all of the units may be selected based on actual needs to achieve the purpose of the technical solution of the embodiments.

In addition, each functional unit in various embodiments of the present disclosure may be integrated into one processing unit, or each unit may exist physically separately, or two or more units may be integrated into one unit.

If the functions are implemented in the form of software functional units as an independent product for sale or use, the software functional units may also be stored in a computer readable storage medium. Based upon such understanding, the technical solutions of the present disclosure essentially or a part thereof contributing to the prior art may be embodied in the form of a computer program product which may be stored in a storage medium and which includes several instructions to cause a computer device (which may be a personal computer, a server, or a network device, etc.) to perform all or some steps of the method according to the respective embodiments of the present disclosure. The foregoing storage medium includes various media that may store program codes, such as a USB flash drive, a mobile hard disk, a ROM, a RAM, a magnetic disk, or an optical disk.

In addition, it should be noted that in the device and the method of the present disclosure, it is apparent that various components or various steps may be decomposed and/or recombined. The decomposition and/or recombination should be considered as equivalents of the present disclosure. Also, the steps of performing the above-described series of processes may naturally be performed in a chronological order or in an order illustrated, but not necessarily be required to be performed in a chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or a computing device network, in forms of hardware, firmware, software, or a combination thereof, which may be implemented by these of ordinary skills in the art using their basic programming skills after they read the description of the present disclosure.

Accordingly, the objects of the present disclosure may also be achieved by running a program or a set of programs on any computing device. The computing device may be a well-known general purpose device. Accordingly, the objects of the present disclosure may also be realized by merely providing a program product including program codes for implementing the method or the device. That is to say, such a program product also constitutes the present disclosure, and a storage medium storing such a program product also constitutes the present disclosure. It will be apparent that the storage medium may be any known storage medium or any storage medium developed in the future. It should also be noted that in the device and the method of the present disclosure, it is apparent that various components or steps may be decomposed and/or recombined. The decomposition and/or recombination should be considered as equivalents to the present disclosure. Also, the steps of performing the series of processes described above may naturally be performed in the chronological order in the order illustrated, but not necessarily be required to be performed in the chronological order. Certain steps may be performed in parallel or independently of one another.

The descriptions above are optional embodiments of the present disclosure. It should be noted that those skilled in the art may make various improvements and the embellishments within the scope of the present disclosure, and the various improvements and the embellishments shall be within the protection scope of the present disclosure.

What is claimed is:

1. A method of configuring a random access resource, the method being applied to a terminal and comprising:
   receiving configuration information of a Physical Random Access Channel (PRACH) resource transmitted by a network node;
   wherein the configuration information is configured to indicate a PRACH transmission resource reserved by the network node for the terminal and used to transmit a beam failure recovery request,
   the configuration information comprises grouping information of preamble sequence codes for carrying the beam failure recovery request,
   the grouping information is used to indicate whether a preamble sequence code within a current group is used for transmitting the beam failure recovery request or not,
   wherein, receiving the configuration information of the PRACH resource transmitted by the network node, comprises:
   receiving the configuration information of the PRACH resource transmitted at preset time by the network node, wherein, the preset time comprises at least one of: a first preset time duration prior to a start of service transmission, a second preset time duration after the start of service transmission, or time when a beam failure is detected for a first time after an access of the terminal is completed;
   or,
   transmitting request information for requesting the PRACH resource to the network node, and receiving the configuration information of the PRACH resource transmitted by the network node according to the request information,
   wherein, after receiving the configuration information of the PRACH resource transmitted by the network node, the method further comprises:
   receiving an activation instruction or a deactivation instruction transmitted by the network node;
   wherein the activation instruction is configured to activate the PRACH resource, and the deactivation instruction is configured to deactivate the PRACH resource.

2. The method of configuring a random access resource according to claim 1, wherein, after receiving the activation instruction or the deactivation instruction transmitted by the network node, the method further comprises:

feeding back acknowledgement (ACK) information/non-acknowledgement (NACK) information to the network node according to the activation instruction or the deactivation instruction.

3. The method of configuring a random access resource according to claim 1, wherein, after receiving the configuration information of the PRACH resource transmitted by the network node, the method further comprises:
receiving a release instruction transmitted by the network node, wherein the release instruction is used to release the PRACH resource.

4. The method of configuring a random access resource according to claim 1, wherein, after receiving the configuration information of the PRACH resource transmitted by the network node, the method further comprises:
transmitting, in a case that a beam failure is detected, the beam failure recovery request to the network node through the PRACH resource.

5. A terminal, comprising:
a processor and a storage, wherein a computer program executable by the processor is stored in the storage, and when the computer program is executed by the processor, the processor implements steps of the method of configuring a random access resource according to claim 1.

6. The method of configuring a random access resource according to claim 1, wherein, the configuration information comprises information of the preamble sequence codes, and the preamble sequence codes comprise a part of preamble sequence codes within a first predetermined group and a part of preamble sequence codes within a second predetermined group.

7. A method of configuring a random access resource, the method being applied to a network node and comprising:
transmitting configuration information of a Physical Random Access Channel (PRACH) resource to at least one terminal, wherein the configuration information is configured to indicate a PRACH transmission resource reserved by the network node for the terminal and used to transmit a beam failure recovery request,
the configuration information comprises grouping information of preamble sequence codes for carrying the beam failure recovery request,
the grouping information is used to indicate whether a preamble sequence code within a current group is used for transmitting the beam failure recovery request or not,
wherein transmitting the configuration information of the PRACH resource to the at least one terminal, comprises:
transmitting the configuration information of the PRACH resource to the at least one terminal at preset time, wherein, the preset time comprises at least one of: a first preset time duration prior to a start of service transmission, a second preset time duration after the start of service transmission, or time when a beam failure is detected for a first time after an access of the terminal is completed;
or,
receiving request information transmitted by the at least one terminal and used for requesting the PRACH resource, and transmitting the configuration information of the corresponding PRACH resource to the terminal according to the request information,
wherein, after transmitting the configuration information of the PRACH resource to the at least one terminal, the method further comprises:
transmitting an activation instruction or a deactivation instruction to the terminal; wherein the activation instruction is used to activate the PRACH resource, and the deactivation instruction is used to deactivate the PRACH resource.

8. The method of configuring a random access resource according to claim 7, wherein, after transmitting the configuration information of the PRACH resource to the at least one terminal, the method further comprises:
transmitting, to the terminal, a release instruction used to release the PRACH resource.

9. A network node, comprising:
a processor and a storage, wherein a computer program executable by the processor is stored in the storage, and when the computer program is executed by the processor, the processor implements steps of the method of configuring a random access resource according to claim 7.

10. The method of configuring a random access resource according to claim 7, wherein, the configuration information comprises information of the preamble sequence codes, and the preamble sequence codes comprise a part of preamble sequence codes within a first predetermined group and a part of preamble sequence codes within a second predetermined group.

\* \* \* \* \*